United States Patent
Ito et al.

(10) Patent No.: US 7,902,701 B2
(45) Date of Patent: Mar. 8, 2011

(54) AUTOMOTIVE ALTERNATOR

(75) Inventors: Shinichi Ito, Chiyoda-ku (JP); Shinji Nishimura, Chiyoda-ku (JP); Atsushi Hirokado, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/749,991

(22) Filed: Mar. 30, 2010

(65) Prior Publication Data

US 2010/0176671 A1  Jul. 15, 2010

Related U.S. Application Data

(62) Division of application No. 11/965,283, filed on Dec. 27, 2007, now Pat. No. 7,723,876.

(30) Foreign Application Priority Data

Jun. 8, 2007  (JP) .................................. 2007-152936

(51) Int. Cl.
    *H02K 11/04*  (2006.01)
(52) U.S. Cl. ...................... 310/68 D; 310/64; 310/68 R
(58) Field of Classification Search ............... 310/68 D, 310/68 R, 59, 64, 52, 71, 62–63
    See application file for complete search history.

(56) References Cited

U.S. PATENT DOCUMENTS

| | | | | |
|---|---|---|---|---|
| 5,095,235 A | * | 3/1992 | Kitamura | 310/68 D |
| 6,198,187 B1 | * | 3/2001 | Asao et al. | 310/68 D |
| 6,285,100 B1 | * | 9/2001 | Pflueger et al. | 310/68 D |
| 6,307,289 B1 | * | 10/2001 | Skala | 310/68 D |
| 7,015,607 B1 | * | 3/2006 | Ikuta et al. | 310/64 |
| 7,067,947 B2 | * | 6/2006 | Ihata et al. | 310/62 |
| 7,183,677 B2 | * | 2/2007 | Ihata et al. | 310/62 |
| 7,535,137 B2 | * | 5/2009 | Ikuta et al. | 310/68 D |

FOREIGN PATENT DOCUMENTS

| | | |
|---|---|---|
| EP | 0-125834 A2 | 11/1984 |
| JP | 7-39110 A | 2/1995 |
| JP | 07303352 A | 11/1995 |
| JP | 2000-069714 A | 3/2000 |
| JP | 3342978 | 11/2002 |
| JP | 2003009465 A | 1/2003 |
| JP | 2004080916 A | 3/2004 |

* cited by examiner

*Primary Examiner* — Thanh Lam
(74) *Attorney, Agent, or Firm* — Sughrue Mion, PLLC

(57) ABSTRACT

A positive-side heatsink and a negative-side heatsink that constitute a rectifier are disposed inside a case at a rear end of a rotor so as to be separated axially such that front surfaces of a positive-side base portion and a negative-side base portion face each other. The negative-side heatsink is disposed such that radiating fins that are disposed so as to project from a rear surface of the negative-side base portion are positioned radially outside a cooling fan so as to face a coil end of a stator coil.

6 Claims, 9 Drawing Sheets

AUTOMOTIVE ALTERNATOR

CROSS REFERENCE TO THE RELATED APPLICATIONS

This application is a Divisional of U.S. patent application Ser. No. 11/965,283 filed Dec. 27, 2007, which claims benefit of Japanese Patent Application No. 2007-152936, filed Jun. 8, 2007. The above-noted application is incorporated herein by reference in its entirety.

BACKGROUND OF THE INVENTION

1. Field of the Invention

The present invention relates to an automotive alternator and particularly relates to a rectifier cooling construction.

2. Description of the Related Art

In conventional automotive alternators, positive-side unidirectional conducting elements and negative-side unidirectional conducting elements have been supported by a positive-side cooling plate and a negative-side cooling plate so as to be positioned approximately in a common plane that is perpendicular to a rotating shaft, cooling fins have been formed so as to project from an opposite side of a first cooling plate from the side on which the unidirectional conducting elements are supported, and a second cooling plate has been fixed to a casing member, such that the cooling fins have been cooled by a cooling fan (see Patent Literature 1, for example).

Patent Literature 1: Japanese Patent No. 13342978 (Gazette)

In conventional automotive alternators, because the positive-side cooling plate and the negative-side cooling plate have been disposed so as to line up radially, the following problems have arisen, preventing effective cooling of rectifying apparatuses:

First, cooling airflows that have been sucked in through ventilating apertures due to rotation of the cooling fan reach the cooling fan through gaps between the positive-side cooling plate and the negative-side cooling plate and gaps between the cooling plate that is positioned inside and a bearing box. Sufficient cross-sectional area cannot be ensured in the gaps at these two positions as air channels through which the cooling airflows may pass, giving rise to pressure loss due to reductions in air channel cross-sectional area as the cooling airflows flow in.

Cooling airflow flow channels that extend from the ventilating apertures to the cooling fan are also divided by the positive-side cooling plate and the negative-side cooling plate. Thus, portions of the cooling airflows are discharged externally without passing through the cooling fins, reducing the volume of cooling airflow that passes through the cooling fins compared to the intake and discharge capacity of the cooling fan.

Because installation space for the cooling plate on the inside is also narrower, the number of cooling fins must be reduced, reducing heat radiating area.

SUMMARY OF THE INVENTION

The present invention aims to solve the above problems and an object of the present invention is to provide an automotive alternator that improves rectifier cooling by adapting arrangement of cooling plates and also by positioning radiating fins downstream from a cooling fan in a cooling airflow flow channel.

In order to achieve the above object, according to one aspect of the present invention, there is provided an automotive alternator including: a rotor that is fixed to a rotating shaft; a case that rotatably supports the rotating shaft and that envelops the rotor; a stator that is constituted by: a cylindrical stator core that is held by the case and that surrounds the rotor; and a stator coil that is mounted to the stator core; a rectifier that has: a positive-side heatsink that has a flat, arc-shaped positive-side base portion; a positive-side rectifying element that is mounted to a front surface of the positive-side base portion; a negative-side heatsink that has a flat, arc-shaped negative-side base portion; and a negative-side rectifying element that is mounted to a front surface of the negative-side base portion, the positive-side heat sink and the negative-side heat sink being disposed inside the case at a first end of the rotor so as to be separated axially such that the front surfaces of the positive-side base portion and the negative-side base portion face each other; and a cooling fan that is fixed to a first end surface of the rotor. An air intake aperture is disposed through the case so as to face whichever heatsink of the positive-side heatsink and the negative-side heatsink is disposed farther away from the rotor, and an air discharge aperture is disposed through the case so as to be positioned radially outside the cooling fan, and a plurality of radiating fins are disposed so as to project from a rear surface of the base portion of whichever heatsink of the positive-side heatsink and the negative-side heatsink is disposed nearer to the rotor. The heatsink that is disposed nearer to the rotor is disposed such that the plurality of radiating fins are positioned radially outside the cooling fan, and a cooling airflow that flows out from the cooling fan passes through the plurality of radiating fins.

According to the present invention, because the positive-side heatsink and the negative-side heatsink are disposed so as to be separated axially such that the front surfaces of the positive-side base portion and the negative-side base portion face each other, space can be enlarged on an inner radial side of the positive-side heatsink and the negative-side heatsink. Thus, because cooling airflows that have been sucked in through the air intake aperture due to rotation of the cooling fan pass through an enlarged gap between the positive-side heatsink and the bearing box to reach the cooling fan, pressure loss is reduced, enabling the volume of cooling air that the cooling fan supplies and discharges to be increased. Because the positive-side heatsink and the negative-side heatsink do not divide the cooling airflow flow channel that extends from the air intake aperture to the cooling fan, the volume of cooling air that passes through the radiating fins is increased.

Because the radiating fins are positioned radially outside the cooling fan, high-speed cooling airflows that have flowed out from the cooling fan flow through the radiating fins, improving heat radiating performance.

DETAILED DESCRIPTION OF THE PREFERRED EMBODIMENTS

Embodiment 1

Figure 1:
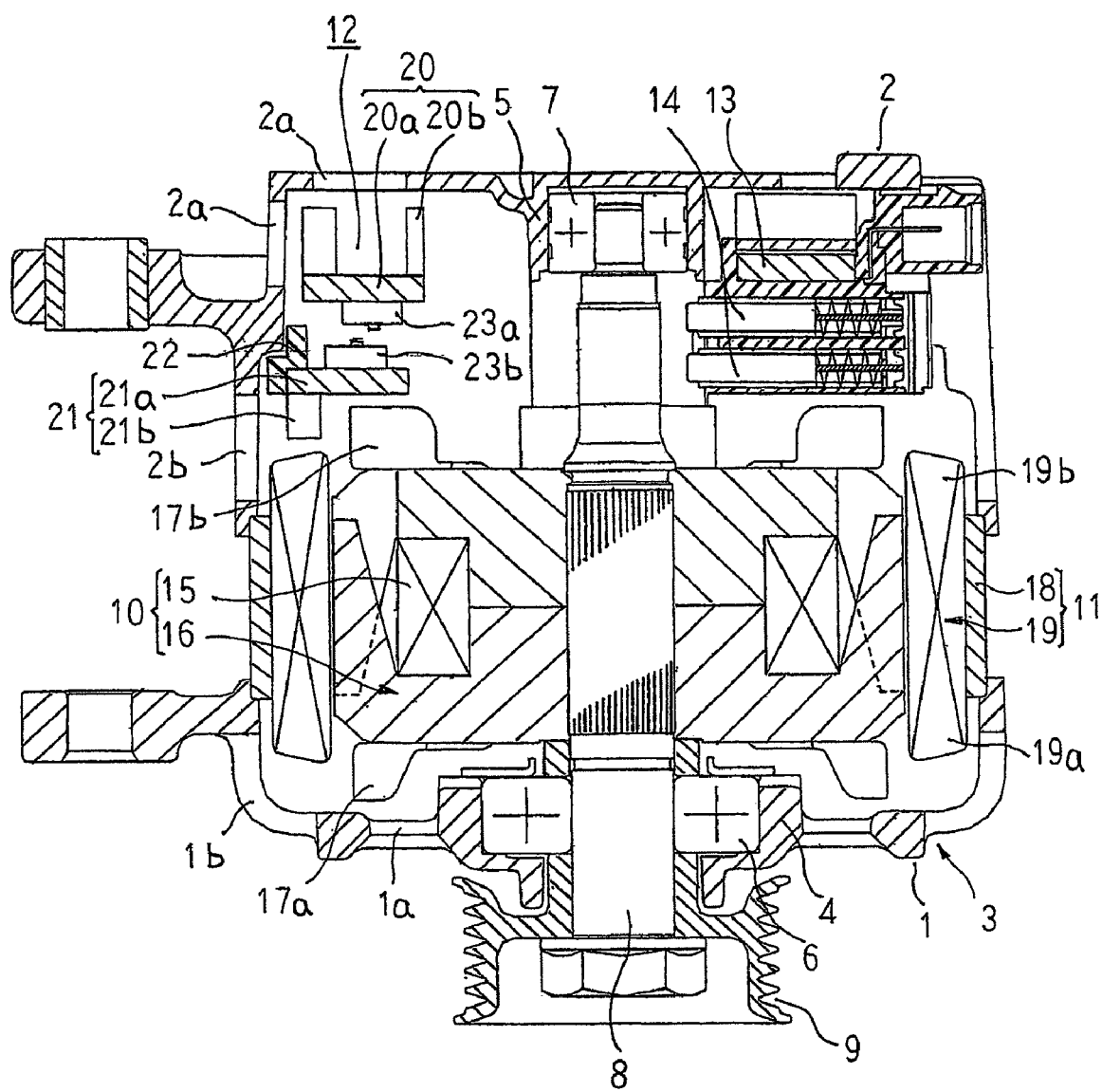
FIG. 1 is a cross section of an overall configuration of an automotive alternator according to Embodiment 1 of the present invention.
Figure 2:
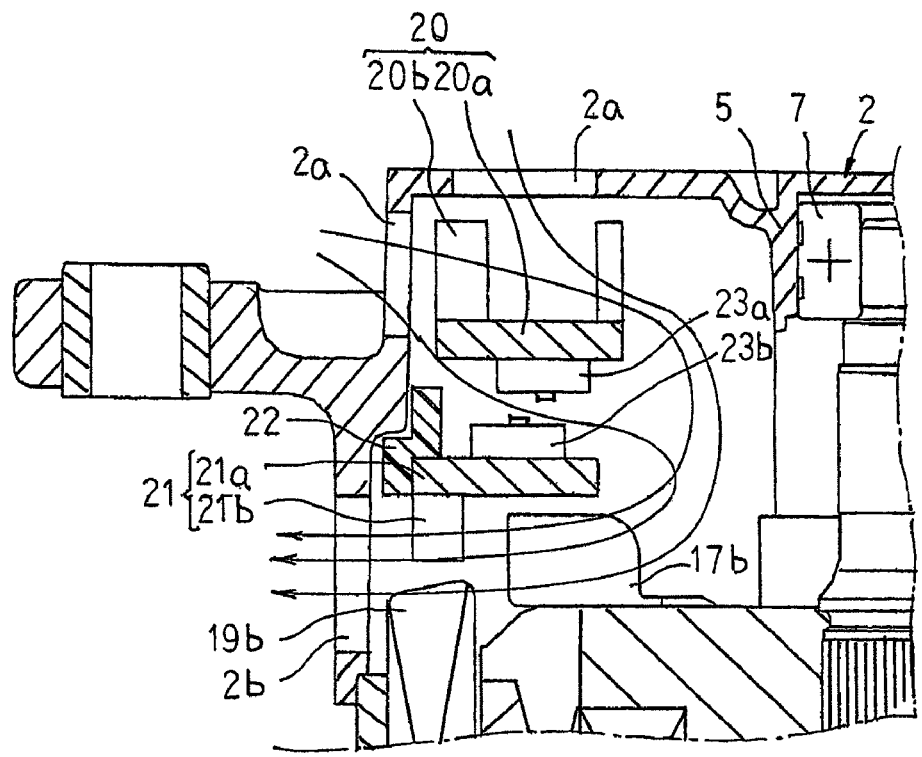
FIG. 2 is a partial cross section that explains cooling airflows in the automotive alternator according to Embodiment 1 of the present invention.

FIG. 1 is a cross section of an overall configuration of an automotive alternator according to Embodiment 1 of the present invention, and FIG. 2 is a partial cross section that explains cooling airflows in the automotive alternator according to Embodiment 1 of the present invention.

In FIG. 1, an automotive alternator includes: a case 3 that is constituted by a front bracket 1 and a rear bracket 2 that are each approximately bowl-shaped and made of aluminum; a rotating shaft 8 that is rotatably supported by bearings 6 and 7 that are housed in front-end and rear-end bearing boxes 4 and 5 that are disposed at central axial positions of the front bracket 1 and the rear bracket 2; a pulley 9 that is fixed to a first end of the rotating shaft 8 that projects outward at a front end of the case 3; a claw-pole rotor 10 that is fixed to the rotating shaft 8 so as to be rotatably disposed inside the case 3; a stator 11 that is held by an inner wall surface of the case 3 so as to surround the rotor 10; a rectifier 12 that is electrically connected to a stator coil 19 of the stator 11 and that rectifies alternating current that is generated in the stator coil 19 into direct current; and a voltage regulator 13 that adjusts magnitude of alternating voltage that is generated in the stator coil 19.

The rotor 10 has: a field coil 15 that generates magnetic flux on passage of electric current; and a pole core 16 that is disposed so as to cover the field coil 15 and in which magnetic poles are formed by the magnetic flux. The rotating shaft 8 is inserted through a central axial position of the pole core 16 and fixed, and front-end and rear-end cooling fans 17a and 17b are fixed to two axial end surfaces of the pole core 16.

The stator 11 includes: a stator core 18 that is held between the front bracket 1 and the rear bracket 2 and that is disposed so as to surround the rotor 10; and a stator coil 19 that is mounted to the stator core 18. Here, a rotating magnetic field is applied to the stator coil 19 due to rotation of the rotor 10, generating electromotive force in the stator coil 19.

The rectifier 12 includes: a positive-side heatsink 20 onto which a plurality of positive-side rectifying elements 23a have been mounted; a negative-side heatsink 21 onto which a plurality of negative-side rectifying elements 23b have been mounted; and a circuit board 22. The positive-side heatsink 20 is made of a good thermally conducting material such as aluminum, etc., and has: a flat, arc-shaped positive-side base portion 20a; and positive-side radiating fins 20b that are each disposed so as to project vertically from a rear surface of the positive-side base portion 20a, that are disposed so as to extend radially on an inner circumferential side and an outer circumferential side of the rear surface of the positive-side base portion 20a, and that are disposed in a radial pattern on the rear surface of the positive-side base portion 20a. The negative-side heatsink 21 is made of a good thermally conducting material such as aluminum, etc., and has: a flat, arc-shaped negative-side base portion 21a; and negative-side radiating fins 21b that are each disposed so as to project vertically from a rear surface of the negative-side base portion 21a, that are disposed so as to extend radially on an outer circumferential side of the rear surface of the negative-side base portion 21a, and that are disposed in a radial pattern on the rear surface of the negative-side base portion 21a. The plurality of positive-side and negative-side rectifying elements 23a and 23b are mounted so as to line up circumferentially on the front surface of each of the base portions 20a and 21a, and are connected by a circuit board 22 so as to constitute a rectifier circuit.

The negative-side heatsink 21 is disposed inside the rear bracket 2 such that the front surface of the negative-side base portion 21a is positioned in a plane that is perpendicular to a central axis of the rotating shaft 8, such that the rear surface of the negative-side base portion 21a faces toward the rotor 10, such that the negative-side radiating fins 21b are positioned radially outside the rear-end cooling fan 17b so as to face coil ends 19b of the stator coil 19, and such that an arc center of the negative-side base portion 21a is approximately aligned with the central axis of the rotating shaft 8. The positive-side heatsink 20 is disposed inside the rear bracket 2 such that the front surface of the positive-side base portion 20a is positioned in a plane that is perpendicular to a central axis of the rotating shaft 8, such that the rear surface of the positive-side base portion 20a faces toward the rotor 10, such that the positive-side base portion 20a is positioned behind the negative-side base portion 21a so as to face the negative-side base portion 21a, and such that an arc center of the positive-side base portion 20a is approximately aligned with the central axis of the rotating shaft 8.

Front-end air intake apertures 1a are disposed through the front bracket 1 in a vicinity of the front-end bearing box 4, and front-end air discharge apertures 1b are disposed radially outside the front-end cooling fan 17a. Rear-end air intake apertures 2a are disposed through the rear bracket 2 so as to face the positive-side heatsink 20, and rear-end air discharge apertures 2b are disposed radially outside the rear-end cooling fan 17b.

In an automotive alternator that is configured in this manner, electric current is first supplied from a battery (not shown) through brushes 14 and the slip rings (not shown) to the field coil 15 of the rotor 10, generating magnetic flux. Magnetic poles are formed in the pole core 16 by this magnetic flux. At the same time, rotational torque from an engine is transmitted from an output shaft of the engine through a belt (not shown) and the pulley 9 to the rotating shaft 8, rotating the rotor 10. Thus, a rotating magnetic field is applied to the stator coil 19 of the stator 11, generating an electromotive force in the stator coil 19. This alternating-current electromotive force is rectified into direct current by the rectifier 12 and charges the battery or is supplied to an electric load. Magnitude of the alternating voltage that is generated in the stator 11 is also adjusted by the voltage regulator 13.

The cooling fans 17a and 17b are rotated together with the rotation of the rotor 10. Thus, at the rear end, as indicated by arrows in FIG. 2, a cooling airflow is sucked inside the rear bracket 2 through the rear-end air intake apertures 2a. This cooling airflow flows radially inward through the positive-side radiating fins 20b of the positive-side heatsink 20, and then flows alongside the rotating shaft 8 toward the rotor 10. Another cooling airflow flows radially inward between the positive-side heatsink 20 and the negative-side heatsink 21. The cooling airflows that have flowed to the rotor 10 are deflected centrifugally by the rear-end cooling fan 17b. Then, a portion of the cooling airflows flows radially outward through the negative-side radiating fins 21b of the negative-side heatsink 21, and is discharged through the rear-end air discharge apertures 2b. A remainder of the cooling airflows cools the coil ends 19b of the stator coil 19, and is discharged through the rear-end air discharge apertures 2b. Thus, heat that is generated by the positive-side and negative-side rectifying elements 23a and 23b of the rectifier 12 is absorbed into the cooling airflows that flow through the radiating fins 20b and 21b, suppressing temperature increases in the positive-side and negative-side rectifying elements 23a and 23b.

At the front end, cooling airflows are also sucked inside the front bracket 1 through the front-end air intake apertures 1b, are deflected centrifugally by the front-end cooling fan 17a, cool the coil ends 19a of the stator coil 19, and are then discharged through the front-end air discharge apertures 1b. Thus, heat that is generated by the stator coil 19, is absorbed into the cooling airflows, suppressing temperature increases in the stator 11.

According to Embodiment 1, the negative-side heatsink 21 is disposed inside the rear bracket 2 such that the negative-side radiating fins 21b are positioned radially outside the cooling fan 17b, and the positive-side heatsink 20 is disposed inside the rear bracket 2 so as to be positioned axially rearward facing the negative-side heatsink 21. Thus, clearances between the positive-side and negative-side heat sinks 20 and 21 and the rear-end bearing box 5 are enlarged, reducing pressure loss in the ventilation channels for the cooling airflows that are formed due to the rotation of the rear-end cooling fan 17b, and enabling the volume of cooling air that is moved by the rear-end cooling fan 17b to be increased. The ventilation channels for the cooling airflows that are formed due to the rotation of the rear-end cooling fan 17b are not divided by the positive-side and negative-side heat sinks 20 and 21, increasing the volume of cooling air that passes through the radiating fins 20b and 21b. Because the positive-side and negative-side heat sinks 20 and 21 are disposed on an outer circumferential side inside the rear bracket 2, installation space for the radiating fins 20b and 21b is wider, enabling the number of fins to be increased and heat radiating area to enlarged.

The negative-side radiating fins 21b are positioned radially outside the rear-end cooling fan 17b. In other words, the radiating fins 21b are disposed closely downstream from the rear-end cooling fan 17b in the ventilation channel for the cooling airflows. Closely downstream from the rear-end cooling fan 17b, the flow velocity of the cooling airflows is approximately equal to the rotational speed of the rear-end cooling fan 17b. The rotational speed of the rear-end cooling fan 17b has a velocity that is several times the flow velocity of cooling airflows that flow through cooling airflow ventilation channels that are far from the rear-end cooling fan 17b. Thus, high-speed cooling airflows flow through the negative-side radiating fins 21b that are disposed closely downstream from the rear-end cooling fan 17b, improving heat radiating performance.

Because the negative-side radiating fins 21b are disposed closely downstream from the rear-end cooling fan 17b in the cooling airflow ventilation channel, heat radiating performance can also be improved since approximately all of the cooling airflow that has been sucked into rear-end cooling fan 17b flows through the negative-side radiating fins 21b.

Because the coil ends 19b of the stator coil 19 and the negative-side radiating fins 21b are disposed so as to face each other closely downstream from the rear-end cooling fan 17b in the cooling airflow ventilation channel, the coil ends 19b of the stator coil 19 and the negative-side radiating fins 21b are cooled simultaneously, enabling the stator 11 and the rectifier 12 to be cooled effectively.

Embodiment 2

Figure 3:
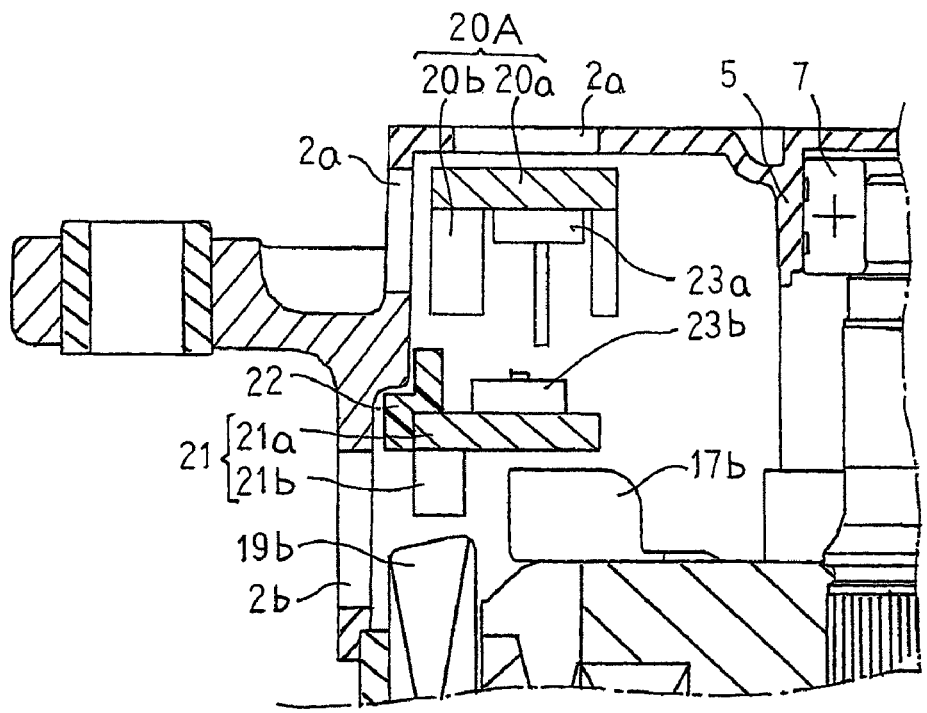
FIG. 3 is a partial cross section of a vicinity of a rectifier of an automotive alternator according to Embodiment 2 of the present invention.

FIG. 3 is a partial cross section of a vicinity of a rectifier of an automotive alternator according to Embodiment 2 of the present invention.

In FIG. 3, in a positive-side heatsink 20A, positive-side radiating fins 20b are each disposed so as to project vertically from a front surface of a positive-side base portion 20a, are disposed so as to extend radially on an inner circumferential side and an outer circumferential side of the front surface of the positive-side base portion 20a, and are disposed in a radial pattern on the front surface of the positive-side base portion 20a. Positive-side rectifying elements 23a are mounted onto the front surface of the positive-side base portion 20a so as to line up circumferentially at a position between the positive-side radiating fins 20b that are arranged on the inner circumferential side and the positive-side radiating fins 20b that are arranged on the outer circumferential side. The positive-side heatsink 20A is disposed inside the rear bracket 2 such that the front surface faces a negative-side heatsink 21. Moreover, the rest of this embodiment is configured in a similar manner to Embodiment 1 above.

Consequently, similar effects to those in Embodiment 1 above can also be achieved in Embodiment 2.

Embodiment 3

Figure 4:
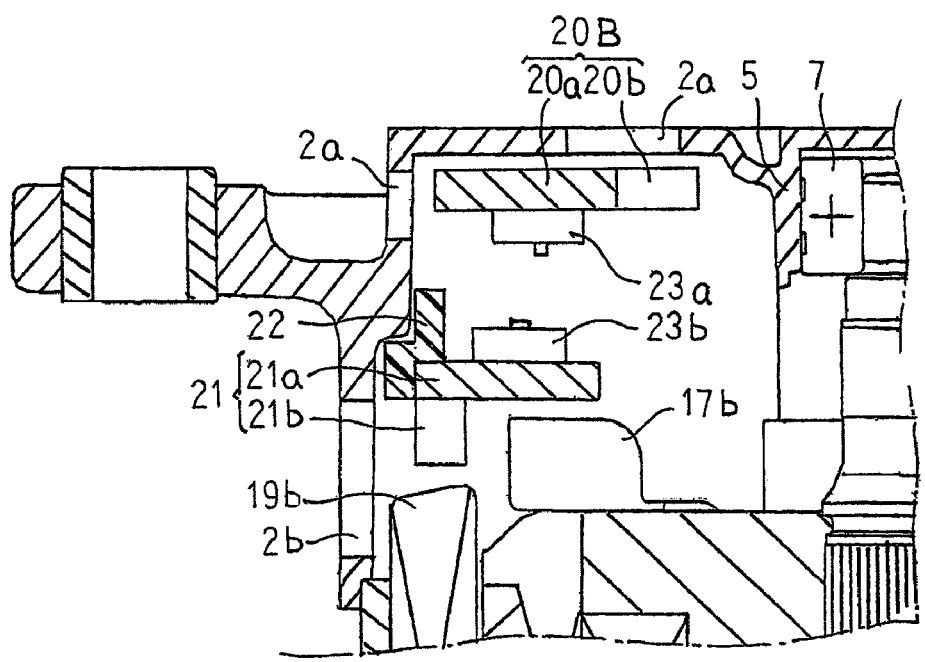
FIG. 4 is a partial cross section of a vicinity of a rectifier of an automotive alternator according to Embodiment 3 of the present invention.

FIG. 4 is a partial cross section of a vicinity of a rectifier of an automotive alternator according to Embodiment 3 of the present invention.

In FIG. 4, in a positive-side heatsink 20B, positive-side radiating fins 20b are each disposed so as to project radially vertically from an inner circumferential end surface of a positive-side base portion 20a, are disposed so as to extend axially on the inner circumferential end surface of the positive-side base portion 20a, and are disposed in a radial pattern on the inner circumferential end surface of the positive-side base portion 20a. Positive-side rectifying elements 23a are mounted onto a front surface of the positive-side base portion 20a so as to line up circumferentially. The positive-side heatsink 20B is disposed inside the rear bracket 2 such that the front surface faces a negative-side heatsink 21. Moreover, the rest of this embodiment is configured in a similar manner to Embodiment 1 above.

Consequently, similar effects to those in Embodiment 1 above can also be achieved in Embodiment 3.

According to Embodiment 3, because the positive-side radiating fins 20b are disposed so as to project radially inward from the inner circumferential end surface of the positive-side base portion 20a, axial length of the automotive alternator can be reduced, enabling reductions in the size of the automotive alternator.

Moreover, in Embodiments 1 through 3 above, radiating fins are disposed on the positive-side heatsink, but the radiating fins may also be omitted and a positive-side heatsink configured using only a base portion.

In Embodiments 1 through 3 above, the negative-side heatsink is disposed such that negative-side radiating fins are positioned closely downstream from the rear-end cooling fan 17b in the cooling airflow ventilation channel, but the positive-side heatsink may also be disposed such that the positive-side radiating fins are positioned closely downstream from the rear-end cooling fan 17b in the cooling airflow ventilation channel.

Embodiment 4

Figure 5:
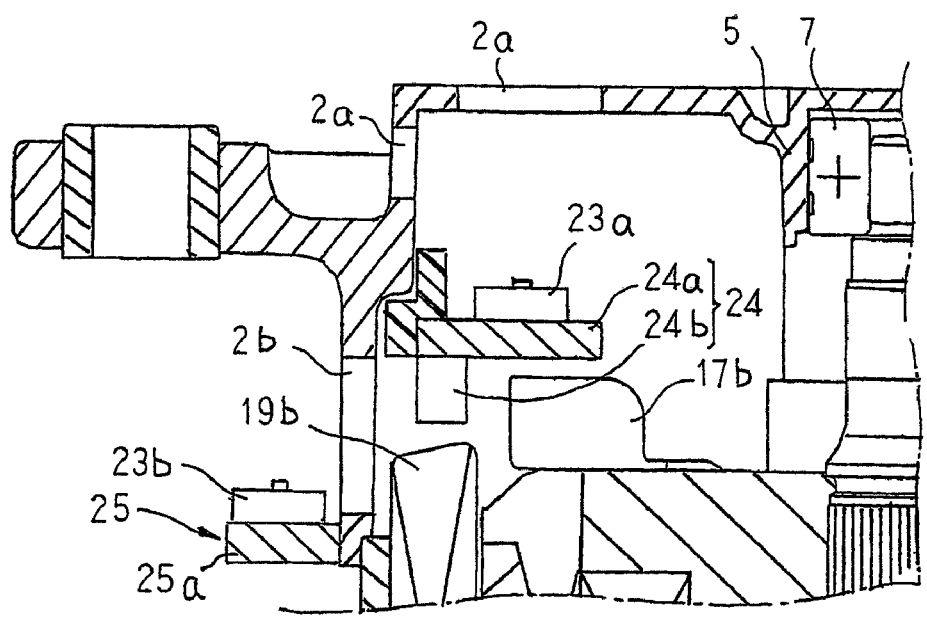
FIG. 5 is a partial cross section of a vicinity of a rectifier of an automotive alternator according to Embodiment 4 of the present invention.

FIG. 5 is a partial cross section of a vicinity of a rectifier of an automotive alternator according to Embodiment 4 of the present invention.

In FIG. 5, a positive-side heatsink 24 is made of a good thermally conducting material such as aluminum, etc., and has: a flat, arc-shaped positive-side base portion 24a; and positive-side radiating fins 24b that are each disposed so as to project vertically from a rear surface of the positive-side base portion 24a, that are disposed so as to extend radially from an outer circumferential side of the rear surface of the positive-side base portion 24a, and that are disposed in a radial pattern on the rear surface of the positive-side base portion 24a. A negative-side heatsink 25 is constituted by only a flat, arc-shaped negative-side base portion 25a that is made of a good thermally conducting material such as aluminum, etc. A plurality of positive-side and negative-side rectifying elements 23a and 23b are mounted so as to line up circumferentially on a front surface of each of the base portions 24a and 25a, and are connected by a circuit board 22 so as to constitute a rectifier circuit.

The positive-side heatsink 24 is disposed inside a rear bracket 2 such that the front surface of the positive-side base portion 24a is positioned in a plane that is perpendicular to a central axis of a rotating shaft 8, such that the rear surface of the positive-side base portion 24a faces toward a rotor 10, such that the positive-side radiating fins 24b are positioned radially outside a rear-end cooling fan 17b so as to face coil ends 19b of a stator coil 19, and such that an arc center of the positive-side base portion 24a is approximately aligned with the central axis of the rotating shaft 8. An inner circumferential end surface of the negative-side base portion 25a of the negative-side heatsink 25 is fixed to an outer circumferential wall surface of the rear bracket 2 such that the front surface of the negative-side base portion 25a faces toward rear-end air discharge apertures 2b.

Moreover, the rest of this embodiment is configured in a similar manner to Embodiment 1 above.

According to Embodiment 4, cooling airflows are sucked into the rear bracket 2 through the rear-end air intake apertures 2a due to rotation of the rear-end cooling fan 17b, and are deflected centrifugally by the rear-end cooling fan 17b. Then, a portion of the cooling airflows flows radially outward through the positive-side radiating fins 24b of the positive-side heatsink 24, and is discharged through the rear-end air discharge apertures 2b. A remainder of the cooling airflows cools the coil ends 19b of the stator coil 19, and is discharged through the rear-end air discharge apertures 2b.

Heat that is generated by the negative-side rectifying elements 23b is transferred to the rear bracket 2 by means of the negative-side base portion 25a of the negative-side heatsink 25, and is radiated from the surface of the rear bracket 2.

Consequently, similar effects to those in Embodiment 1 above can also be achieved in Embodiment 4.

According to Embodiment 4, because it is not necessary to dispose a negative-side heatsink behind the positive-side heatsink 24, cross-sectional area of the cooling airflow ventilation channel can be enlarged, enabling the volume of cooling air to be increased, and axial dimensions of the automotive alternator can also be reduced.

Moreover, in Embodiment 4 above, the negative-side rectifying elements 23b are mounted to an outer wall surface of the rear bracket 2 by means of the negative-side heatsink 25, but the negative-side rectifying elements 23b may also be mounted directly to the outer wall surface of the rear bracket 2. In that case, the number of parts is reduced, simplifying assembly processes.

Embodiment 5

Figure 6:
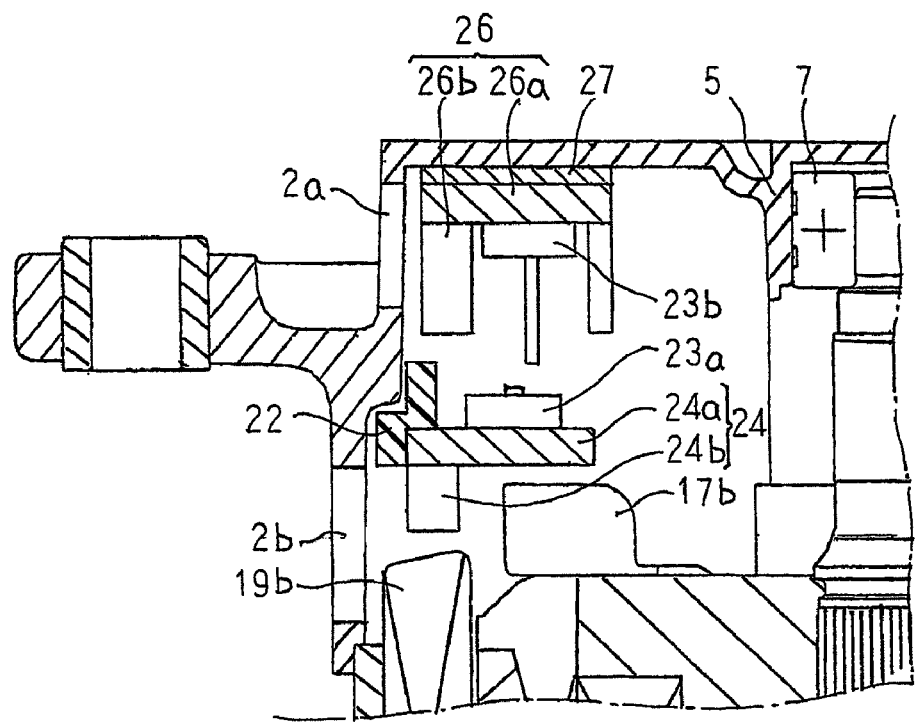
FIG. 6 is a partial cross section of a vicinity of a rectifier of an automotive alternator according to Embodiment 5 of the present invention.

FIG. 6 is a partial cross section of a vicinity of a rectifier of an automotive alternator according to Embodiment 5 of the present invention.

In FIG. 6, a positive-side heatsink 24 is made of a good thermally conducting material such as aluminum, etc., and has: a flat, arc-shaped positive-side base portion 24a; and positive-side radiating fins 24b that are each disposed so as to project vertically from a rear surface of the positive-side base portion 24a, that are disposed so as to extend radially from an outer circumferential side of the rear surface of the positive-side base portion 24a, and that are disposed in a radial pattern on the rear surface of the positive-side base portion 24a. A plurality of positive-side rectifying elements 23a are mounted onto a front surface of the positive-side base portion 24a so as to line up circumferentially. The negative-side heatsink 26 has: a flat, arc-shaped negative-side base portion 26a that is made of a good thermally conducting material such as aluminum, etc.; and negative-side radiating fins 26b that are each disposed so as to project vertically from a front surface of the negative-side base portion 26a, that are disposed so as to extend radially on an inner circumferential side and an outer circumferential side of the front surface of the negative-side base portion 26a, and that are disposed in a radial pattern on the front surface of the negative-side base portion 26a. A plurality of negative-side rectifying elements 23b are mounted onto the front surface of the negative-side base portion 26a so as to line up circumferentially at a position between the negative-side radiating fins 26b that are arranged on the inner circumferential side and the negative-side radiating fins 26b that are arranged on the outer circumferential side. The positive-side and negative-side rectifying elements 23a and 23b that are mounted onto the front surface of the base portions 24a and 26a are connected by a circuit board 22 so as to constitute a rectifier circuit.

The positive-side heatsink 24 is disposed inside a rear bracket 2 such that the front surface of the positive-side base portion 24a is positioned in a plane that is perpendicular to a central axis of a rotating shaft 8, such that the rear surface of the positive-side base portion 24a faces toward a rotor 10, such that the positive-side radiating fins 24b are positioned radially outside a rear-end cooling fan 17b so as to face coil ends 19b of a stator coil 19, and such that an arc center of the positive-side base portion 24a is approximately aligned with the central axis of the rotating shaft 8. The negative-side heatsink 26 is mounted to an inner wall surface of the rear bracket 2 with a material 27 that has good thermal conductivity interposed such that the front surface of the negative-side base portion 26a is positioned in a plane that is perpendicular to a central axis of the rotating shaft 8, such that the front surface of the negative-side base portion 26a faces toward the rotor 10, such that the negative-side base portion 26a is positioned behind the positive-side base portion 24a so as to face the positive-side base portion 24a, and such that an arc center of the negative-side base portion 26a is approximately aligned with the central axis of the rotating shaft 8. Greases, resins, or radiating sheets, etc., that have high thermal conductivity can be used for the material 27 that has good thermal conductivity.

Moreover, the rest of this embodiment is configured in a similar manner to Embodiment 1 above.

According to Embodiment 5, cooling airflows are sucked into the rear bracket 2 through the rear-end air intake apertures 2a due to rotation of the rear-end cooling fan 17b, flow through the negative-side radiating fins 26b to an inner circumferential side, flow along the rotating shaft 8 toward the rotor 10, and are then deflected centrifugally by the rear-end cooling fan 17b. Then, a portion of the cooling airflows flows radially outward through the positive-side radiating fins 24b of the positive-side heatsink 24, and is discharged through the rear-end air discharge apertures 2b. A remainder of the cooling airflows cools the coil ends 19b of the stator coil 19, and is discharged through the rear-end air discharge apertures 2b.

Consequently, similar effects to those in Embodiment 1 above can also be achieved in Embodiment 5.

According to Embodiment 5, because the negative-side base portion 26a is mounted to the inner wall surface of the rear bracket 2 by means of the material 27 that has good thermal conductivity, heat that is generated by the negative-side rectifying elements 23b is transferred to the rear bracket 2 by means of the negative-side base portion 26a and the material 27 that has good thermal conductivity, and is radiated from the surface of the rear bracket 2. As a result, because radiating effects from the front surface of the rear bracket 2 are added to radiating effects from the negative-side radiating fins 26b, heat radiating performance is improved.

Embodiment 6

Figure 7:
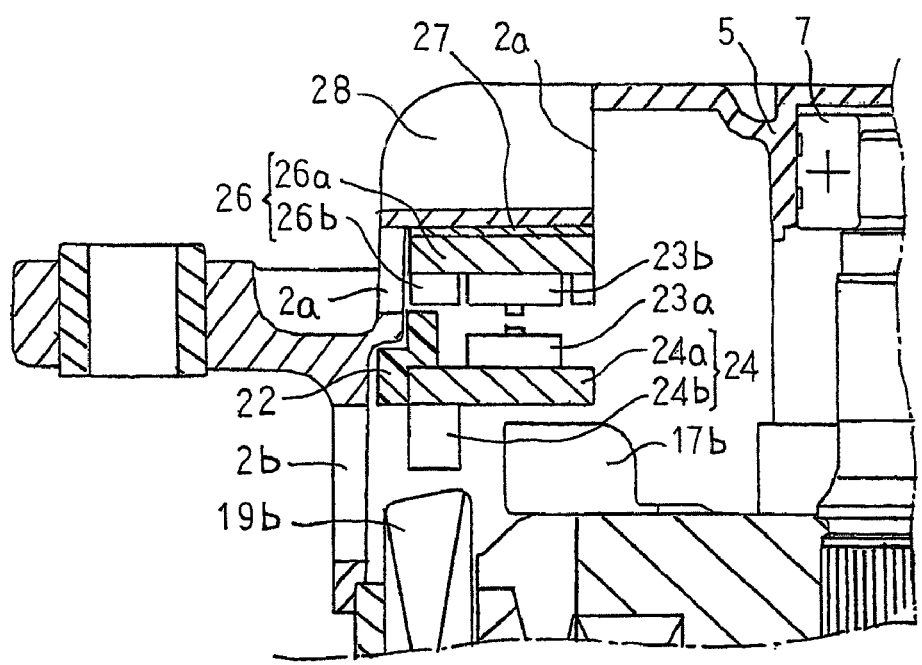
FIG. 7 is a partial cross section of a vicinity of a rectifier of an automotive alternator according to Embodiment 6 of the present invention.

In Embodiment 6, as shown in FIG. 7, a flat rib 28 is disposed on an air intake portion of a rear bracket 2.

Moreover, the rest of this embodiment is configured in a similar manner to Embodiment 5 above.

According to Embodiment 6, because the flat rib 28 is disposed on the air intake portion of the rear bracket 2, surface area of the rear bracket 2 is increased, and radiation from the front surface of the rear bracket 2 is facilitated, further improving heat radiating performance.

Moreover, the shape of the rib 28 is not limited to being flat, and may also be a rod shape.

Embodiment 7

Figure 8:
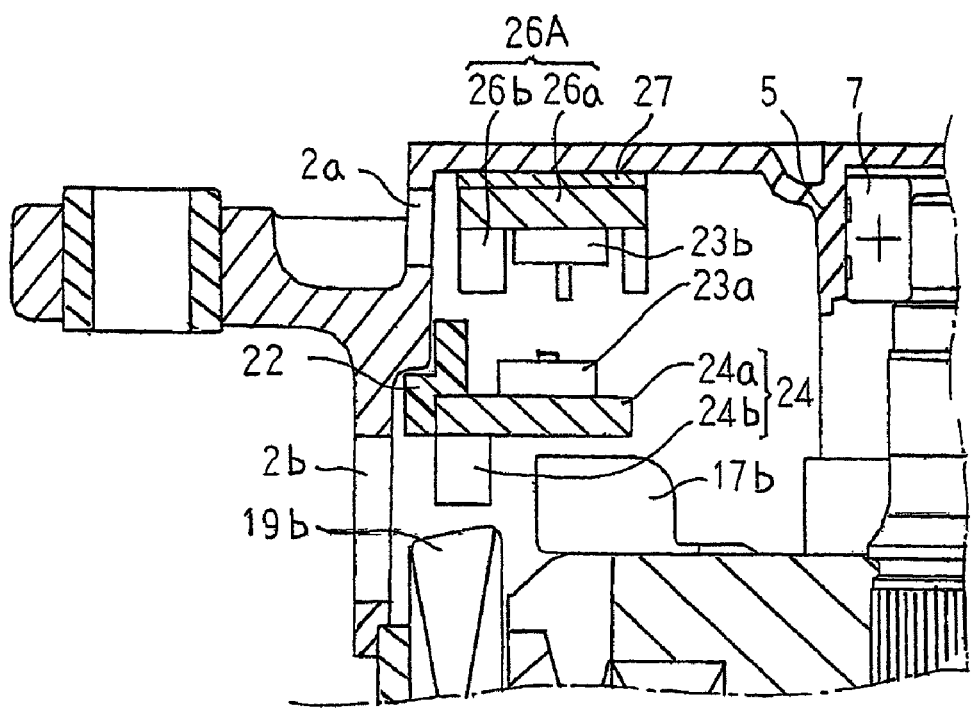
FIG. 8 is a partial cross section of a vicinity of a rectifier of an automotive alternator according to Embodiment 7 of the present invention.

In Embodiment 7, as shown in FIG. 8, projecting height of negative-side radiating fins 26b from a negative-side base portion 26a of a negative-side heatsink 26A is lowered.

Moreover, the rest of this embodiment is configured in a similar manner to Embodiment 5 above.

According to Embodiment 7, because there are radiating effects from the front surface of the rear bracket 2, heat radiating area of the negative-side radiating fins 26b can be reduced. As a result, pressure loss can be reduced, enabling the volume of cooling air that is sucked in by the rear-end cooling fan 17b to be increased, and axial length of the automotive alternator can also be reduced.

Embodiment 8

Figure 9:
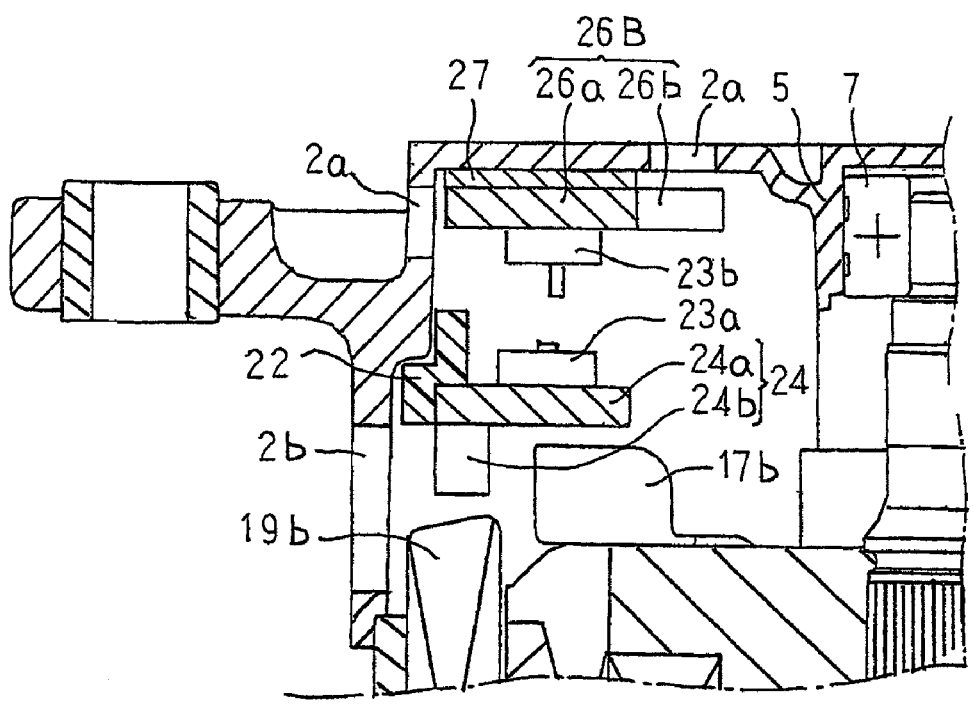
FIG. 9 is a partial cross section of a vicinity of a rectifier of an automotive alternator according to Embodiment 8 of the present invention.

In Embodiment 8, as shown in FIG. 9, in a negative-side heatsink 26B, negative-side radiating fins 26b are each disposed so as to project radially vertically from an inner circumferential end surface of a negative-side base portion 26a, are disposed so as to extend axially on the inner circumferential end surface of the negative-side base portion 26a, and are disposed in a radial pattern on the inner circumferential end surface of the negative-side base portion 26a. Negative-side rectifying elements 23b are mounted onto a front surface of the negative-side base portion 26a so as to line up circumferentially. The negative-side heatsink 26B is mounted to an inner wall surface of the rear bracket 2 with a material 27 that has good thermal conductivity interposed such that the front surface of the negative-side base portion 26a is positioned in a plane that is perpendicular to a central axis of the rotating shaft 8, such that the front surface of the negative-side base portion 26a faces toward the rotor 10, such that the negative-side base portion 26a is positioned behind the positive-side base portion 24a so as to face the positive-side base portion 24a, and such that an arc center of the negative-side base portion 26a is approximately aligned with the central axis of the rotating shaft 8.

Moreover, the rest of this embodiment is configured in a similar manner to Embodiment 5 above.

According to Embodiment 8, because the negative-side radiating fins 26b project radially inward from the inner circumferential end surface of the negative-side base portion 26a, axial length of the automotive alternator can be reduced.

Moreover, in Embodiments 5 through 8 above, radiating fins 26b are disposed on the negative-side base portion 26a, but the negative-side radiating fins 26b may also be omitted.

Now, in Embodiments 1 through 8 above, arrangements of positive-side heatsinks and the negative-side heatsinks have been explained, but shapes of radiating fins of heatsinks that are disposed in close proximity to a rear-end cooling fan 17b will be explained below.

Embodiment 9

Figure 10:
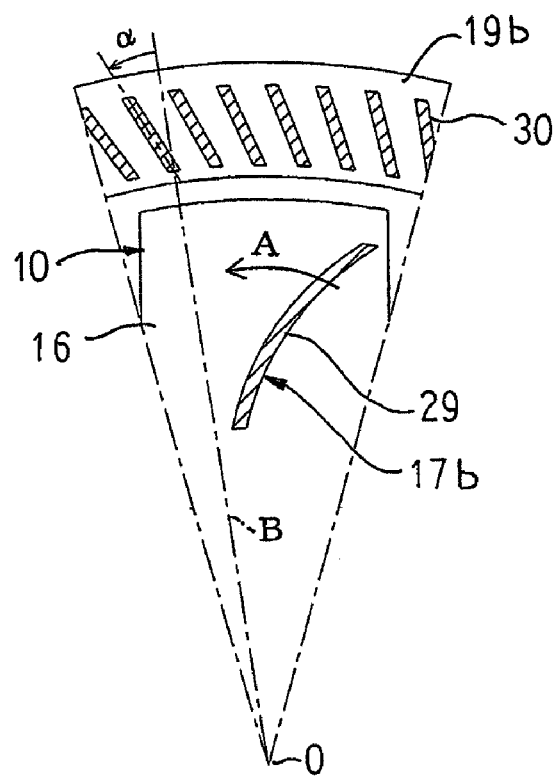
FIG. 10 is a projection in which a rear-end cooling fan, radiating fins that are disposed radially outside the rear-end cooling fan, and rear-end coil ends are projected onto a plane that is perpendicular to a central axis of a rotating shaft in an automotive alternator according to Embodiment 9 of the present invention.
Figure 11A:
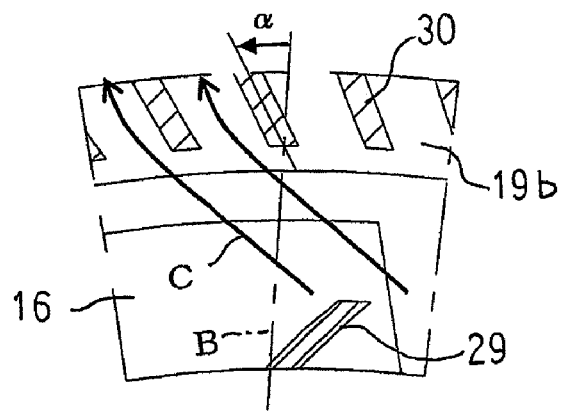
FIGS. 11A and 11B are schematic diagrams that explain how cooling airflows that have flowed out from the cooling fan flow through the radiating fins.
Figure 11B:
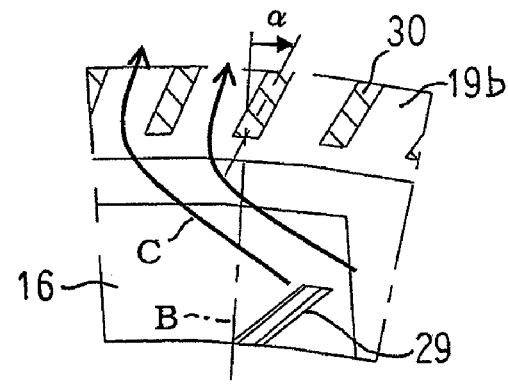

FIG. 10 is a projection in which a rear-end cooling fan, radiating fins that are disposed radially outside the rear-end cooling fan, and rear-end coil ends are projected onto a plane that is perpendicular to a central axis of a rotating shaft in an automotive alternator according to Embodiment 9 of the present invention, and FIGS. 11A and 11B are schematic diagrams that explain how cooling airflows that have flowed out from the cooling fan flow between the radiating fins. Moreover, numeral 29 in FIG. 10 represents a blade of a rear-end cooling fan 17b, and arrow A indicates a direction of rotation of a rotor 10. Arrows C in FIG. 11 indicate directions of flow of cooling airflows.

In FIG. 10, radiating fins 30 are formed such that a cross section of each that is perpendicular to a central axis of the rotating shaft 8 has a long, thin rectangular shape, and are arranged in a row at a uniform pitch circumferentially. The radiating fins 30 that are arranged in a row circumferentially are disposed radially outside a rear-end cooling fan 17b so as to face rear-end coil ends 19b. The respective radiating fins 30 intersect at an angle of inclination α with straight lines B that extends in a radial pattern in a radial direction from a center of rotation O of the rotor 10. Here, the angle of inclination α is an angle that is formed by a center line in a thickness direction of a radiating fin 30 and a straight line B that extends radially from the center of rotation O of the rotor 10 and passes through the radiating fin 30 in a plane that is perpendicular to a central axis of a rotating shaft 8. Moreover, in the case of radiating fins that have long, thin rectangular cross sections, the center lines in the thickness direction of the radiating fins correspond to longitudinal directions.

Cooling airflows flow out from the rotating cooling fan 17b in directions that are inclined forward in the direction of rotation relative to the straight lines B. Thus, if the radiating fins 30 are inclined forward in the direction of rotation relative to the straight lines B, when the cooling airflows flow out from the cooling fan 17b and reach the radiating fins 30, their directions of flow are changed slightly by the radiating fins 30 as they flow between the radiating fins 30, as indicated by the arrows C in FIG. 11A. On the other hand, if the radiating fins 30 are inclined backward in the direction of rotation relative to the straight lines B, when the cooling airflows flow out from the cooling fan 17b and reach the radiating fins 30, their directions of flow are changed dramatically by the radiating fins 30 as they flow between the radiating fins 30, as indicated by the arrows C in FIG. 11B.

Thus, because the directions of flow of the cooling airflows that have flowed out from the cooling fan 17b and have reached the radiating fins 30 are changed dramatically by the radiating fins 30 if the radiating fins 30 are inclined backward in the direction of rotation relative to the straight lines B that extend radially from the center of rotation O of the rotor 10, pressure loss is greatly increased, reducing the volume of cooling air.

From the above, it is preferable for the radiating fins 30 to be parallel to the straight lines B that extend radially from the center of rotation O of the rotor 10, or to be inclined forward in the direction of rotation relative to the straight lines B. Since the directions of outflow of the cooling airflows from the cooling fan 17b differ depending on the shape of the blades 29 and the rotational speed of the rotor 10, it is particularly desirable for the angle of inclination α of the radiating fins 30 relative to the straight lines B to be set so as to match the directions of outflow of the cooling airflows from the cooling fan 17b in an operating state in which the automotive alternator is mainly used.

Moreover, the radiating fins that are arranged in a radial pattern on an outer circumferential side of a rear surface of a base portion in Embodiments 1 through 8 above correspond to fins that are parallel to the straight lines B.

Embodiment 10

Figure 12A:
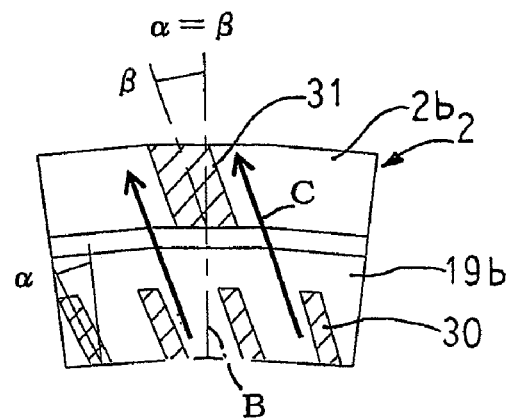
FIGS. 12A, 12B, and 12C are projections in which radiating fins that are disposed radially outside a rear-end cooling fan and rear-end air discharge apertures are projected onto a plane that is perpendicular to a central axis of a rotating shaft in an automotive alternator according to Embodiment 10 of the present invention.
Figure 12B:
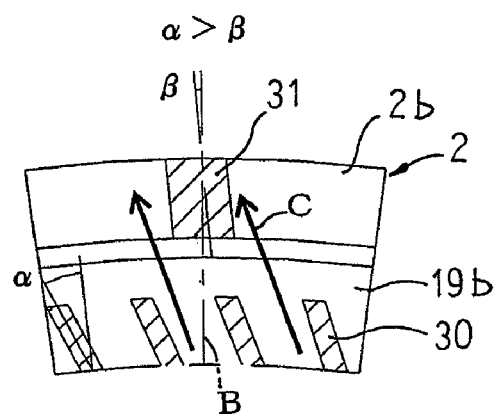
Figure 12C:
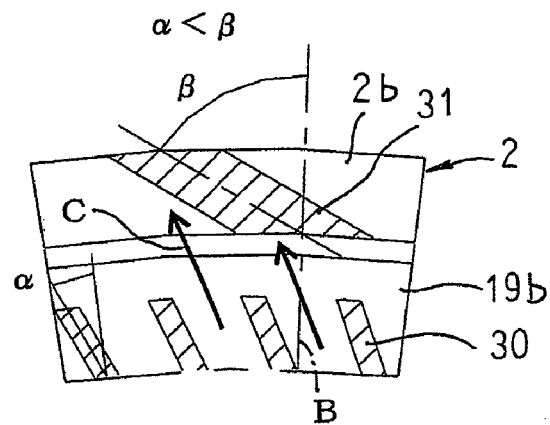

FIGS. 12A, 12B, and 12C are projections in which radiating fins that are disposed radially outside a rear-end cooling fan and rear-end air discharge apertures are projected onto a plane that is perpendicular to a central axis of a rotating shaft in an automotive alternator according to Embodiment 10 of the present invention.

In FIGS. 12A, 12B, and 12C, radiating fins 30 are arranged in a row circumferentially at an angle of inclination α, and air discharge ribs 31 are arranged in a row circumferentially at an angle of inclination β.

Now, if the angle of inclination α of the radiating fins 30 is equal to the angle of inclination β of the air discharge ribs 31, the directions of flow of the cooling airflows that have flowed out from between the radiating fins 30 are parallel to the air discharge ribs 31, as shown in FIG. 12A, minimizing collisions between the cooling airflows and the air discharge ribs 31 and changes in directions of flow of the cooling airflows, etc., and also minimizing pressure loss.

If the angle of inclination α of the radiating fins 30 is greater than the angle of inclination β of the air discharge ribs 31, portions of the cooling airflows that have flowed out from between the radiating fins 30 collide with wall surfaces of the air discharge ribs 31 that are rearward relative to the direction of rotation, as shown in FIG. 12B, and their directions are changed slightly as they are discharged. Thus, collisions between the cooling airflows and the air discharge ribs 31 and changes in directions of flow of the cooling airflows, etc., are reduced, also reducing pressure loss.

If the angle of inclination β of the air discharge ribs 31 is greater than the angle of inclination α of the radiating fins 30, as shown in FIG. 12C, wall surfaces of the air discharge ribs 31 that are forward relative to the direction of rotation may act so as to obstruct the cooling airflows that have flowed out from between the radiating fins 30. Thus, collisions between the cooling airflows and the air discharge ribs 31 and changes in directions of flow of the cooling airflows, etc., are increased, increasing pressure loss, and also reducing the volume of cooling air.

From the above, it is preferable for the radiating fins 30 and the air discharge ribs 31 to be disposed such that the angle of inclination α of the radiating fins 30 is greater than or equal to the angle of inclination β of the air discharge ribs 31.

Embodiment 11

Figure 13:
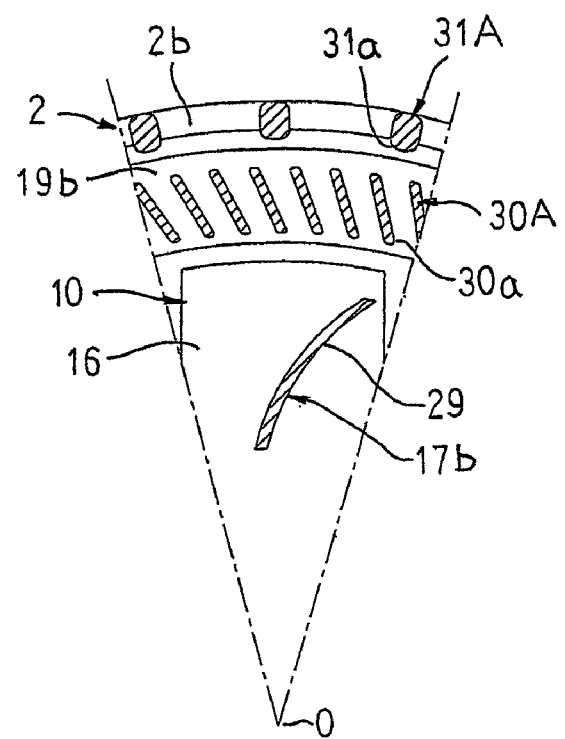
FIG. 13 is a projection in which a rear-end cooling fan, radiating fins that are disposed radially outside the rear-end cooling fan, and rear-end air discharge apertures are projected onto a plane that is perpendicular to a central axis of a rotating shaft in an automotive alternator according to Embodiment 11 of the present invention.
Figure 14A:
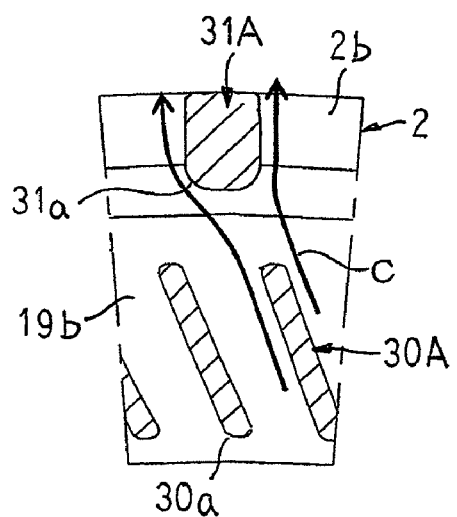
FIGS. 14A and 14B are schematic diagrams that explain how cooling airflows that have flowed out from between the radiating fins flow through the discharge apertures.
Figure 14B:
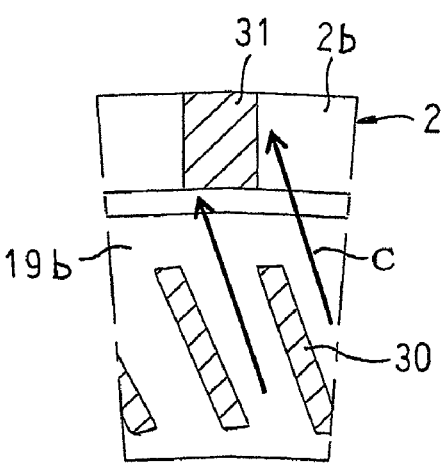

FIG. 13 is a projection in which a rear-end cooling fan, radiating fins that are disposed radially outside the rear-end cooling fan, and rear-end air discharge apertures are projected onto a plane that is perpendicular to a central axis of a rotating shaft in an automotive alternator according to Embodiment 11 of the present invention, and FIGS. 14A and 14B are schematic diagrams that explain how cooling airflows that have flowed out from between the radiating fins flow through the discharge apertures.

In Embodiment 11, as shown in FIG. 13, fillet surfaces 30a and 31a are formed on respective corner portions of radiating fins 30A and air discharge ribs 31A.

Now, in the case of air discharge ribs 31 in which fillet surfaces are not formed on corner portions, as shown in FIG. 14B, cooling airflows collide with the air discharge ribs 31, and then detachment occurs at the corner portions of the air discharge ribs 31, increasing pressure loss. As a result, reductions in the volume of cooling air and increases in wind noise occur due to collisions. In the case of radiating fins 30, the cooling airflows also collide with the radiating fins 30 and then detachment occurs at the corner portions of the radiating fins 30, giving a similar result.

In Embodiment 11, as shown in FIG. 14A, because the cooling airflows collide with the air discharge ribs 31A and then flow along the fillet surfaces 31a, the occurrence of detachment of the cooling airflows is suppressed, reducing pressure loss. As a result, reductions in the volume of cooling air and increases in wind noise due to collisions are suppressed. Similarly, because the fillet surfaces 30a are formed on the corner portions of the radiating fins 30A, the occurrence of detachment of the cooling airflows is suppressed because the cooling airflows collide with the radiating fins 30A then flow along the fillet surfaces 30a.

Because the fillet surfaces 30a and 31a are formed on the corner portions of the radiating fins 30A and the air discharge ribs 31A, inflow and outflow of the cooling airflows can be enlarged without reducing the surface area of the radiating fins 30A and the air discharge ribs 31A, thereby suppressing pressure loss.

Figure 15:
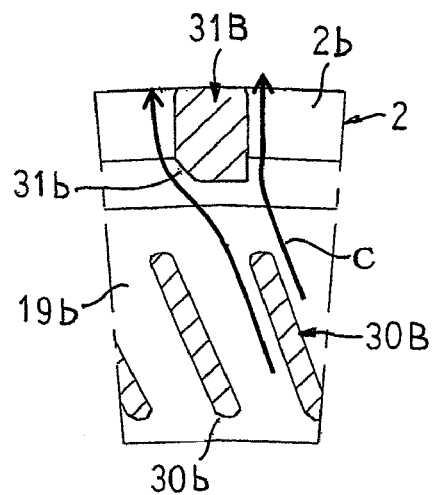
FIG. 15 is a schematic diagram that explains how cooling airflows that have flowed out from between the radiating fins flow through the discharge apertures in an automotive alternator according to Embodiment 11 of the present invention.

Moreover, in Embodiment 11 above, the corner portions of the radiating fins 30A and the air discharge ribs 31A are formed so as to have a curved shape, but corner portions 30b and 31b of radiating fins 30B and air discharge ribs 31B may also be chamfered to form a tapered shape, as shown in FIG. 15.

Embodiment 12

Figure 16:
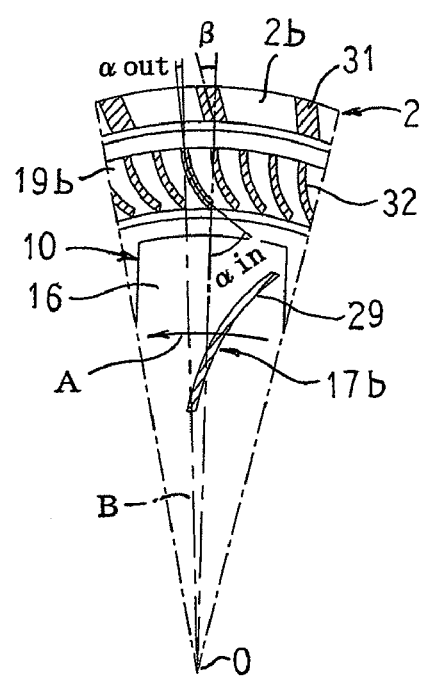
FIG. 16 is a projection in which a rear-end cooling fan, radiating fins that are disposed radially outside the rear-end cooling fan, rear-end coil ends, and rear-end air discharge apertures are projected onto a plane that is perpendicular to a central axis of a rotating shaft in an automotive alternator according to Embodiment 12 of the present invention.
Figure 17:
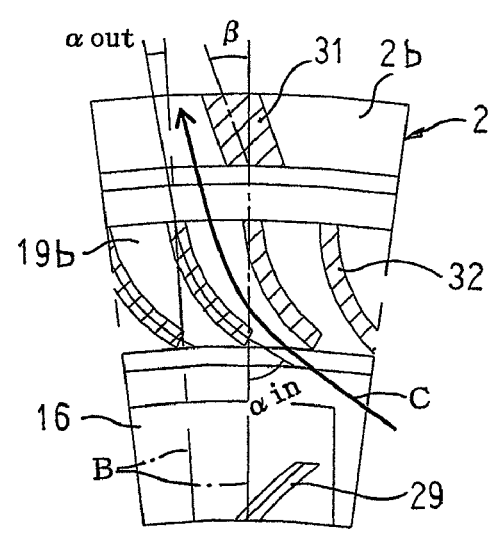
FIG. 17 is a schematic diagram that explains how cooling airflows that have flowed out from the cooling fan flow through the radiating fins.

FIG. 16 is a projection in which a rear-end cooling fan, radiating fins that are disposed radially outside the rear-end cooling fan, rear-end coil ends, and rear-end air discharge apertures are projected onto a plane that is perpendicular to a central axis of a rotating shaft in an automotive alternator according to Embodiment 12 of the present invention, and FIG. 17 is a schematic diagram that explains how cooling airflows that have flowed out from the cooling fan flow between the radiating fins.

In FIG. 16, radiating fins 32 are formed such that a cross section of each that is perpendicular to a central axis of the rotating shaft 8 is a thin curved body in which an angle relative to a straight line B gradually decreases, and are arranged in a row at a uniform pitch circumferentially. The radiating fins 32 that are arranged in a row circumferentially are disposed radially outside a rear-end cooling fan 17b so as to face rear-end coil ends 19b. Air discharge ribs 31 that define air discharge apertures 2b are inclined at an angle β forward in a direction of rotation A relative to the straight lines B.

Since the rear bracket 2 is produced using molding, or die casting, there is a limit to the angle of inclination β of the air discharge ribs 31. If the angle of inclination β of the air discharge ribs 31 is large, the number of air discharge ribs 31 must be reduced, reducing the cross-sectional area of the air discharge apertures 2b. At the same time, the faster the rotational speed of the rotor 10, the more tangential to the rotor 10 the directions of outflow of the cooling airflows from the cooling fan 17b become.

Collisions between the cooling airflows and the radiating fins 32 and changes in the directions of the cooling airflows are minimized as the cooling airflows flow in between the radiating fins 32 if the radiating fins 32 are disposed parallel to the directions of flow of the cooling airflows, and pressure loss is also minimized. For this reason, it is desirable for an angle of inclination $\alpha_{in}$ on an inflow side of the radiating fins 32 to be increased so as approach being tangential to the rotor 10, and for an angle of inclination $\alpha_{out}$ on an outflow side to approach the angle of inclination β of the air discharge ribs 31.

In Embodiment 12, because the angle of inclination $\alpha_{in}$ on the inflow side of the radiating fins 32 is set so as to be greater than the angle of inclination $\alpha_{out}$ on the outflow side, the angle of inclination $\alpha_{in}$ on the inflow side of the radiating fins 32 can be made to approach being tangential to the rotor 10, and the angle of inclination $\alpha_{out}$ on the outflow side can be made to approach the angle of inclination β of the air discharge ribs 31. Thus, pressure loss is reduced when the cooling airflows flow into the radiating fins 32, and the pressure loss is also reduced when the cooling airflows flow into the air discharge apertures 2b.

Because inflow end portions and outflow end portions of the radiating fins 32 are linked into smooth curved surfaces such that the angle of inclination α decreases gradually, the cooling airflows flow smoothly along the curved surfaces of the radiating fins 32 as they flow through the radiating fins 32, as indicated by arrows in FIG. 17, reducing pressure loss that results from changes in direction of the cooling airflows.

Thus, according to the present invention, because high-speed cooling airflows on the outflow side of the cooling fan are used directly for the cooling of the radiating fins, a high-performance automotive alternator in which heat radiating performance is high can be achieved.

The number and cross-sectional shapes of the radiating fins of the heatsinks are not limited to those of the above embodiments.

Similar effects can also be achieved if an insulating coating is applied to the radiating fins of the heatsinks.

What is claimed is:
1. An automotive alternator comprising:
a rotor that is fixed to a rotating shaft;
a case that rotatably supports said rotating shaft and that envelops said rotor;
a stator comprising:
a cylindrical stator core that is held by said case and that surrounds said rotor; and
a stator coil that is mounted to said stator core;
a rectifier comprising:
a positive-side heatsink that has a flat, arc-shaped positive-side base portion;
a positive-side rectifying element that is mounted to a front surface of said positive-side base portion;
a negative-side heatsink that has a flat, arc-shaped negative-side base portion; and
a negative-side rectifying element that is mounted to a front surface of said negative-side base portion,
said positive-side heat sink and said negative-side heat sink being disposed inside said case at a first end of said rotor so as to be separated axially such that said front surfaces of said positive-side base portion and said negative-side base portion face each other; and
a cooling fan that is fixed to a first end surface of said rotor, said automotive alternator being characterized in that:
an air intake aperture is disposed through said case so as to face whichever heatsink of said positive-side heatsink and said negative-side heatsink is disposed farther away from said rotor, and an air discharge aperture is disposed through said case so as to be positioned radially outside said cooling fan;
a plurality of radiating fins are disposed so as to project from a rear surface of said base portion of whichever heatsink of said positive-side heatsink and said negative-side heatsink is disposed nearer to said rotor; and said heatsink that is disposed nearer to said rotor is disposed such that said plurality of radiating fins are positioned radially outside said cooling fan, and a cooling airflow that flows out from said cooling fan passes through said plurality of radiating fins.

2. An automotive alternator according to claim 1, wherein a coil end of said stator coil is disposed radially outside said cooling fan so as to face said plurality of radiating fins.

3. An automotive alternator according to claim 1, wherein said plurality of radiating fins are arranged in a row circumferentially such that each of said radiating fins is parallel to a straight line that extends radially from a center of rotation of said rotor or is inclined forward in a direction of rotation relative to said straight line.

4. An automotive alternator according to claim 3, wherein:
an inner circumferential angle of inclination of an inner circumferential end portion of said radiating fins relative to said straight line is greater than an outer circumferential angle of inclination of an outer circumferential end portion of said radiating fins relative to said straight line; and
said radiating fins are formed so as to have a curved shape in which an angle of inclination relative to said straight line gradually decreases from said inner circumferential angle of inclination to said outer circumferential angle of inclination.

5. An automotive alternator according to claim 3, wherein an outer circumferential angle of inclination of an outer circumferential end portion of said radiating fins relative to said straight line is greater than or equal to an angle of inclination relative to said straight line of an air discharge rib that constitutes said air discharge aperture that is disposed through said case.

6. An automotive alternator according to claim 1, wherein a corner portion of said radiating fins and an air discharge rib that constitutes said air discharge aperture that is disposed through said case is machined so as to have a tapered shape or a rounded shape.

* * * * *